US010557103B2

(12) United States Patent
Kaneko et al.

(10) Patent No.: US 10,557,103 B2
(45) Date of Patent: Feb. 11, 2020

(54) REFRIGERATOR LUBRICATING OIL AND MIXED COMPOSITION FOR REFRIGERATOR

(71) Applicant: IDEMITSU KOSAN CO., LTD., Chiyoda-ku (JP)

(72) Inventors: Masato Kaneko, Ichihara (JP); Takahiro Hoshida, Kariya (JP)

(73) Assignee: IDEMITSU KOSAN CO., LTD., Chiyoda-ku (JP)

(*) Notice: Subject to any disclaimer, the term of this patent is extended or adjusted under 35 U.S.C. 154(b) by 103 days.

(21) Appl. No.: 15/555,896

(22) PCT Filed: Mar. 10, 2016

(86) PCT No.: PCT/JP2016/057674
§ 371 (c)(1),
(2) Date: Sep. 5, 2017

(87) PCT Pub. No.: WO2016/158307
PCT Pub. Date: Oct. 6, 2016

(65) Prior Publication Data
US 2018/0044608 A1  Feb. 15, 2018

(30) Foreign Application Priority Data
Mar. 30, 2015  (JP) ................................. 2015-070116

(51) Int. Cl.
C09K 5/04 (2006.01)
C10M 169/04 (2006.01)
C10M 135/20 (2006.01)
C10M 105/38 (2006.01)
C10M 135/22 (2006.01)
C10M 135/28 (2006.01)
F25B 31/00 (2006.01)
F25B 1/00 (2006.01)

(52) U.S. Cl.
CPC ........... *C10M 169/04* (2013.01); *C09K 5/045* (2013.01); *C10M 105/38* (2013.01); *C10M 135/20* (2013.01); *C10M 135/22* (2013.01); *C10M 135/28* (2013.01); *F25B 31/002* (2013.01); *C09K 5/04* (2013.01); *C09K 2205/122* (2013.01); *C09K 2205/126* (2013.01); *C09K 2205/22* (2013.01); *C10M 2207/2835* (2013.01); *C10M 2219/022* (2013.01); *C10M 2219/082* (2013.01); *C10M 2219/086* (2013.01); *C10N 2220/302* (2013.01); *C10N 2220/306* (2013.01); *C10N 2230/36* (2013.01); *C10N 2240/30* (2013.01); *C10N 2260/10* (2013.01); *F25B 1/00* (2013.01); *F25B 2500/221* (2013.01)

(58) Field of Classification Search
CPC .. C10M 2209/1055; C10M 2207/2835; C10M 2209/043; C10M 2209/1085; C10M 171/008
See application file for complete search history.

(56) References Cited

U.S. PATENT DOCUMENTS

| 5,798,054 A * | 8/1998 | Sato ........................ C09K 5/045 252/68 |
| 2003/0171222 A1 * | 9/2003 | Sullivan ................ C10M 135/22 508/192 |
| 2005/0107269 A1 * | 5/2005 | Yagishita .............. C10M 141/10 508/440 |
| 2007/0213239 A1 | 9/2007 | Kaneko |
| 2008/0110799 A1 * | 5/2008 | Matsui .................. C10M 169/04 208/19 |
| 2010/0038583 A1 * | 2/2010 | Shimomura ........... C09K 5/044 252/68 |
| 2011/0011123 A1 | 1/2011 | Matsuura et al. |
| 2011/0319679 A1 | 12/2011 | Takagi et al. |
| 2014/0128302 A1 | 5/2014 | Matsumoto |
| 2015/0376543 A1 * | 12/2015 | Saito .................... C10M 169/04 252/68 |
| 2016/0215231 A1 * | 7/2016 | Iba ......................... C07C 319/22 |
| 2018/0201867 A1 | 7/2018 | Saito et al. |

FOREIGN PATENT DOCUMENTS

| CN | 101851545 A | 10/2010 |
| EP | 1 792 970 A1 | 6/2007 |
| JP | 5-70785 A | 3/1993 |
| JP | 10-147682 A | 6/1998 |

(Continued)

OTHER PUBLICATIONS

Extended European Search Report dated Sep. 11, 2018 in European Patent Application No. 16772191.9, 8 pages.
International Search Report dated May 31, 2016 in PCT/JP2016/057674 filed Mar. 10, 2016.
Kazuo Nishimoto et al., "Daitai Fluorocarbon-yo Gomu Zairyo", Journal of the Society of Rubber Industry, 1997, vol. 70, No. 1, pp. 25-31.

(Continued)

*Primary Examiner* — John R Hardee
(74) *Attorney, Agent, or Firm* — Oblon, McClelland, Maier & Neustadt, L.L.P.

(57) ABSTRACT

The refrigerator lubricating oil of the present invention contains: a base oil containing, as a major component, a polyol ester (A) of a fatty acid (a1) that is a fatty acid having a number of carbon atoms of from 3 to 18 and a polyol (a2) that is selected from neopentyl glycol, trimethylolethane, trimethylolpropane, trimethylolbutane, pentaerythritol, and dipentaerythritol; and a disulfide and/or trisulfide compound (B), and the disulfide and/or trisulfide compound (B) is blended in an amount of from 30 to 10,000 ppm by mass in terms of sulfur equivalent based on the total amount of the refrigerator lubricating oil.

15 Claims, No Drawings

(56) References Cited

FOREIGN PATENT DOCUMENTS

| JP | 2004-67836 A | 3/2004 |
|---|---|---|
| JP | 2009-222032 A | 10/2009 |
| JP | 2010-255623 A | 11/2010 |
| JP | 2011-202032 A | 10/2011 |
| JP | 2013-14673 A | 1/2013 |
| JP | 2013-170225 A | 9/2013 |
| WO | 2006/030490 A1 | 3/2006 |
| WO | 2011/162340 A1 | 12/2011 |
| WO | WO 2014/132676 A1 | 9/2014 |

OTHER PUBLICATIONS

Yukihiro Higashi, "Trend of the Search for New Refrigerant to the Next Generation", Refrigeration, Sep. 2014, vol. 89, No. 1043, pp. 3-8.

Office Action dated Jan. 8, 2019 in Japanese Patent Application No. 2015-070116 (with unedited computer generated English translation).

Japanese Office Action dated Aug. 13, 2019, in Patent Application No. 2015-070116, 8 pages (with unedited computer generated English translation).

\* cited by examiner

REFRIGERATOR LUBRICATING OIL AND MIXED COMPOSITION FOR REFRIGERATOR

TECHNICAL FIELD

The present invention relates to a refrigerator lubricating oil used for mixing with various refrigerants, and a mixed composition for a refrigerator containing the refrigerator lubricating oil and a refrigerant, and especially relates to a refrigerator lubricating oil applied to a car air-conditioner, such as an electric car air-conditioner and an open type car air-conditioner, and a mixed composition for a refrigerator

BACKGROUND ART

In general, a refrigerator is constituted by at least a compressor, a condenser, an expansion mechanism (such as an expansion valve), and an evaporator, or furthermore by a dryer, and has a structure that a mixture of a refrigerant and a refrigerator lubricating oil is circulated in the closed system. As the refrigerant for a refrigerator, a chlorine-containing compound, such as a chlorofluorocarbon, has been widely used, but in consideration of the environment protection, it is being replaced by a compound containing no chlorine, such as a hydrofluorocarbon (HFC), and a natural refrigerant, such as carbon dioxide. Examples of the hydrofluorocarbon in practical use include a saturated hydrofluorocarbon (which may be hereinafter referred to as a saturated HFC), which is represented by 1,1,1,2-tetrafluoroethane, difluoromethane, pentafluoroethane, and 1,1,1-trifluoroethane (which may be hereinafter referred to as R134a, R32, R125, and R143a, respectively).

However, as a refrigerant for a car air-conditioner, it is currently difficult to use carbon dioxide requiring high pressure as the major component, and the saturated HFC also has a problem of the high global warming potential. Under the circumstances, it is being considered in recent years to use an unsaturated fluorinated hydrocarbon compound, such as HFO1234ze and HFO1234yf, as a refrigerant capable of being used in a car air-conditioner, irrespective of the low global warming potential thereof.

For a refrigerant containing an unsaturated fluorinated hydrocarbon compound, it is considered to use an oxygen-containing compound, such as a polyoxyalkylene glycol compound, a polyol ester compound, and a polycarbonate compound, as a base oil of a refrigerator lubricating oil.

As the polyol ester-based refrigerator lubricating oil used for a refrigerant containing an unsaturated fluorinated hydrocarbon compound, it has been known that, for example, an ester of hindered alcohol, such as pentaerythritol, is contained as a base oil, and an antioxidant, an extreme pressure agent, an anti-wear agent, an oxygen scavenger, and the like are blended as additives depending on necessity (see, for example, PTLs 1 and 2). The examples of the extreme pressure agent described therein include a sulfurized olefin, a sulfurized oil or fat, and the like, and the examples of the anti-wear agent and the oxygen scavenger described therein include various monosulfide compounds.

CITATION LIST

Patent Literatures

PTL 1: JP 2013-170225 A
PTL 2: JP 2011-202032 A

SUMMARY OF INVENTION

Technical Problem

However, the ordinary polyol ester-based refrigerator lubricating oil swells various rubber members used in a refrigerator, which may cause a danger of leakage of the refrigerant and leakage of the refrigerator lubricating oil.

The present invention has been made in consideration of the aforementioned problems, and an object thereof is to provide a refrigerator lubricating oil that is capable of properly suppressing the swelling of various rubber members used in a refrigerator, and to provide a mixed composition for a refrigerator containing the refrigerator lubricating oil and a refrigerant.

Solution to Problem

As a result of earnest investigations made by the present inventors, it has been found that a refrigerator lubricating oil containing a particular polyol ester base oil having blended therewith a disulfide and/or trisulfide compound can properly suppress the swelling of various rubber members used in a refrigerator, and the present invention described below has been completed. Thus, the present invention provides the following items (1) to (17).

(1) A refrigerator lubricating oil containing: a base oil containing, as a major component, a polyol ester (A) of a fatty acid (a1) that is a fatty acid having a number of carbon atoms of from 3 to 18 and a polyol (a2) that is selected from neopentyl glycol, trimethylolethane, trimethylolpropane, trimethylolbutane, pentaerythritol, and dipentaerythritol; and a disulfide and/or trisulfide compound (B), the disulfide and/or trisulfide compound (B) being blended in an amount of from 30 to 10,000 ppm by mass in terms of sulfur equivalent based on the total amount of the refrigerator lubricating oil.

(2) The refrigerator lubricating oil according to the item (1), wherein the fatty acid (a1) is a fatty acid having a number of carbon atoms of from 5 to 18.

(3) The refrigerator lubricating oil according to the item (1) or (2), wherein the polyol (a2) is pentaerythritol and/or dipentaerythritol.

(4) The refrigerator lubricating oil according to any one of the items (1) to (3), wherein the polyol ester (A) is an ester of a mixed fatty acid of two or more kinds thereof and the polyol (a2).

(5) The refrigerator lubricating oil according to any one of the items (1) to (4), wherein the refrigerator lubricating oil is used for a refrigerator having provided therein a rubber member selected from hydrogenated nitrile rubber, nitrile rubber, chloroprene rubber, an ethylene-propylene-diene terpolymer, silicone rubber, butyl rubber, styrene-butadiene rubber, urethane rubber, chlorosulfonated polyethylene, and fluorine rubber.

(6) The refrigerator lubricating oil according to the item (5), wherein the rubber member is selected from hydrogenated nitrile rubber, chloroprene rubber, and an ethylene-propylene-diene terpolymer.

(7) The refrigerator lubricating oil according to any one of the items (1) to (6), wherein the refrigerator lubricating oil contains at least one additive selected from an extreme pressure agent, an oily agent, an antioxidant, an acid scavenger, and a defoaming agent.

(8) The refrigerator lubricating oil according to any one of the items (1) to (7), wherein the refrigerator lubricating oil is used for a refrigerator system, a hot water supply system, or a heating system selected from a car air-conditioner, a gas heat pump system, an air conditioner, a refrigerating chamber, an automatic vending machine, a showcase, a hot water supplier, and a floor heating system.

(9) The refrigerator lubricating oil according to the item (8), wherein the system has a water content therein of 300 ppm by mass or less and a residual air partial pressure therein of 10 kPa or less.

(10) A mixed composition for a refrigerator, containing:
a refrigerant containing at least one unsaturated fluorinated hydrocarbon compound selected from compounds represented by the following molecular formula (1):

$$C_pF_rH_s \quad (1)$$

wherein p represents an integer of from 2 to 6; r represents an integer of from 1 to 11; and s represents an integer of from 1 to 11, provided that the compound has one or more carbon-carbon unsaturated bond in a molecule, and a refrigerator lubricating oil containing: a base oil containing, as a major component, a polyol ester (A) of a fatty acid (a1) that is a fatty acid having a number of carbon atoms of from 3 to 18 and a polyol (a2) that is selected from neopentyl glycol, trimethylolethane, trimethylolpropane, trimethylolbutane, pentaerythritol, and dipentaerythritol; and a disulfide and/or trisulfide compound (B), the disulfide and/or trisulfide compound (B) being blended in an amount of from 30 to 10,000 ppm by mass in terms of sulfur equivalent based on the total amount of the refrigerator lubricating oil.

(11) The mixed composition for a refrigerator according to the item (10), wherein the refrigerant consists of the unsaturated fluorinated hydrocarbon compound.

(12) The mixed composition for a refrigerator according to the item (10), wherein the refrigerant further contains a saturated fluorinated hydrocarbon compound, and the saturated fluorinated hydrocarbon compound is at least one selected from 1,1-difluoroethane, trifluoroethane, tetrafluoroethane, and pentafluoroethane.

(13) The mixed composition for a refrigerator according to any one of the items (10) to (12), wherein the unsaturated fluorinated hydrocarbon compound is a fluoride of propene.

(14) The mixed composition for a refrigerator according to the item (13), wherein the fluoride of propene is at least one selected from isomers of pentafluoropropene, 3,3,3-trifluoropropene, 1,3,3,3-tetrafluoropropene, and 2,3,3,3-tetrafluoropropene.

(15) A lubricating method including using a refrigerator lubricating oil in a refrigerator using a refrigerant containing at least one unsaturated fluorinated hydrocarbon compound selected from compounds represented by the following molecular formula (1):

$$C_pF_rH_s \quad (1)$$

wherein p represents an integer of from 2 to 6; r represents an integer of from 1 to 11; and s represents an integer of from 1 to 11, provided that the compound has one or more carbon-carbon unsaturated bond in a molecule, the lubricating oil containing: a base oil containing, as a major component, a polyol ester (A) of a fatty acid (a1) that is a fatty acid having a number of carbon atoms of from 3 to 18 and a polyol (a2) that is selected from neopentyl glycol, trimethylolethane, trimethylolpropane, trimethylolbutane, pentaerythritol, and dipentaerythritol; and a disulfide and/or trisulfide compound (B), the disulfide and/or trisulfide compound (B) being blended in an amount of from 30 to 10,000 ppm by mass in terms of sulfur equivalent based on the total amount of the refrigerator lubricating oil.

(16) A refrigerator including:
a refrigerant containing at least one unsaturated fluorinated hydrocarbon compound selected from compounds represented by the following molecular formula (1);

$$C_pF_rH_s \quad (1)$$

wherein p represents an integer of from 2 to 6; r represents an integer of from 1 to 11; and s represents an integer of from 1 to 11, provided that the compound has one or more carbon-carbon unsaturated bond in a molecule, and a refrigerator lubricating oil containing; a base oil containing, as a major component, a polyol ester (A) of a fatty acid (a1) that is a fatty acid having a number of carbon atoms of from 3 to 18 and a polyol (a2) that is selected from neopentyl glycol, trimethylolethane, trimethylolpropane, trimethylolbutane, pentaerythritol, and dipentaerythritol; and a disulfide and/or trisulfide compound (B), the disulfide and/or trisulfide compound (B) being blended in an amount of from 30 to 10,000 ppm by mass in terms of sulfur equivalent based on the total amount of the refrigerator lubricating oil.

(17) A method for producing a refrigerator lubricating oil, including blending: at least a base oil containing, as a major component, a polyol ester (A) of a fatty acid (a1) that is a fatty acid having a number of carbon atoms of from 3 to 18 and a polyol (a2) that is selected from neopentyl glycol, trimethylolethane, trimethylolpropane, trimethylolbutane, pentaerythritol, and dipentaerythritol; and a disulfide and/or trisulfide compound (B) to obtain a refrigerator lubricating oil, the disulfide and/or trisulfide compound (B) being blended in an amount of from 30 to 10,000 ppm by mass in terms of sulfur equivalent based on the total amount of the refrigerator lubricating oil.

Advantageous Effects of Invention

According to the present invention, a refrigerator lubricating oil can be provided that is capable of properly suppressing the swelling of various rubber members used in a refrigerator, and a mixed composition for a refrigerator containing the refrigerator lubricating oil and a refrigerant can be provided.

DESCRIPTION OF EMBODIMENTS

Preferred embodiments of the present invention will be described in detail below.

The refrigerator lubricating oil according to the present invention is used mainly for the following refrigerant. The mixed composition for a refrigerator according to the present invention contains the refrigerator lubricating oil and the refrigerant. The refrigerant and the refrigerator lubricating oil will be described in more detail below.

<Refrigerant>

The refrigerant according to the present invention may be a so-called natural refrigerant, such as carbon dioxide, ammonia, and a hydrocarbon, or a refrigerant containing various fluorinated hydrocarbon compounds, and particularly preferably a refrigerant that contains at least one unsaturated fluorinated hydrocarbon compound selected from compounds represented by the following molecular formula (1);

$$C_pF_rH_s \quad (1)$$

wherein p represents an integer of from 2 to 6; r represents an integer of from 1 to 11, provided that the compound has one or more carbon-carbon unsaturated bond in a molecule.

The molecular formula (1) shows the kinds and the numbers of the elements in the molecule, and the formula (1) represents an unsaturated fluorinated hydrocarbon compound having a number p of carbon atoms C of from 2 to 6. With having a number of carbon atoms of from 2 to 6, the unsaturated fluorinated hydrocarbon compound can have physical and chemical properties, such as a boiling point, a freezing point, and an evaporation latent heat, that are required for a refrigerant.

In the molecular formula (1), the bond types of the p carbon atoms represented by $C_p$ include a carbon-carbon single bond and an unsaturated bond, such as a carbon-carbon double bond. The carbon-carbon unsaturated bond is preferably a carbon-carbon double bond from the standpoint of the stability, and the unsaturated fluorinated hydrocarbon compound preferably has 1 or more unsaturated bond, such as a carbon-carbon double bond, in the molecule thereof, with the number thereof being preferably 1. Namely, at least one of the bond types of the p carbon atoms represented by $C_p$ is more preferably a carbon-carbon double bond.

Preferred examples of the unsaturated fluorinated hydrocarbon compound include fluorinated compounds of a linear or branched olefin having a number of carbon atoms of from 2 to 6 and a cyclic olefin having a number of carbon atoms of from 4 to 6.

Specific examples thereof include a fluorinated compound of ethylene having from 1 to 3 fluorine atoms introduced therein, a fluorinated compound of propene having from 1 to 5 fluorine atoms introduced therein, a fluorinated compound of butene having from 1 to 7 fluorine atoms introduced therein, a fluorinated compound of pentene having from 1 to 9 fluorine atoms introduced therein, a fluorinated compound of hexene having from 1 to 11 fluorine atoms introduced therein, a fluorinated compound of cyclobutene having from 1 to 5 fluorine atoms introduced therein, a fluorinated compound of cyclopentene having from 1 to 7 fluorine atoms introduced therein, and a fluorinated compound of cyclohexene having from 1 to 9 fluorine atoms introduced therein.

Among these unsaturated fluorinated hydrocarbon compounds, a fluorinated compound of propene is preferred, a propene compound having from 3 to 5 fluorine atoms introduced therein is more preferred, and preferred specific examples thereof include isomers of pentafluoropropene, 3,3,3-trifluoropropene, 1,3,3,3-tetrafluoropropene represented by HFO1234ze, and 2,3,3,3-tetrafluoropropene represented by HFO1234yf.

Among these, a propene compound having 4 fluorine atoms introduced therein is more preferred, and 2,3,3,3-tetrafluoropropene represented by HFO1234yf is particularly preferred.

In the present invention, the unsaturated fluorinated hydrocarbon compound may be used solely or as a combination of two or more kinds thereof.

[Additional Component]

In the present invention, the refrigerant may be a mixed refrigerant that contains an additional component in addition to the unsaturated fluorinated hydrocarbon compound as necessary, and for example, may contain a saturated fluorinated hydrocarbon compound.

The saturated fluorinated hydrocarbon compound is preferably a fluorinated compound of an alkane having a number of carbon atoms of from 2 to 4, and examples thereof include trifluoroethane, such as 1,1-difluoroethane (R152a), 1,1,1-trifluoroethane (R143a), and 1,1,2-trifluoroethane (R143), tetrafluoroethane, such as 1,1,1,2-tetrafluoroethane (R134a) and 1,1,2,2-tetrafluoroethane (R134), and pentafluoroethane, such as 1,1,1,2,2-pentafluoroethane (R125), which are a fluorinated compound of an ethane. The saturated fluorinated hydrocarbon compound may be used solely or as a combination of two or more kinds thereof.

The refrigerant may contain carbon dioxide, and in this case, the refrigerant preferably contains the unsaturated fluorinated hydrocarbon compound, carbon dioxide, and an additional third component. Specifically, the refrigerant preferably contains 1,3,3,3-tetrafluoropropene (HFO1234ze), carbon dioxide (R-744), and the third component that is selected from difluoromethane (R32), 1,1-difluoroethane (R152a), fluoroethane (R161), 1,1,1,2-tetrafluoroethane (R134a), propylene, propane, and mixtures thereof.

The refrigerant preferably contains the unsaturated fluorinated hydrocarbon compound represented by the molecular formula (1) as a major component. The term "containing as a major component" means that the refrigerant contains the compound in an amount of 50% by mass or more based on the total amount of the refrigerant, and the content thereof is preferably 70% by mass or more, more preferably 80% by mass or more, and further preferably 90% by mass or more, based on the total amount of the refrigerant. The additional component, such as the saturated fluorinated hydrocarbon compound, is preferably not blended, and the refrigerant preferably consists of the unsaturated fluorinated hydrocarbon compound.

<Refrigerator Lubricating Oil>

The refrigerator lubricating oil of the present invention contains: a base oil containing, as a major component, a polyol ester (A); and a disulfide and/or trisulfide compound (B).

The polyol ester (A) will be described in more detail below.

[Polyol Ester (A)] (Base Oil)

The polyol ester (A) of the present invention is an ester of a fatty acid (a1) that is a fatty acid having a number of carbon atoms of from 3 to 18 and a polyol (a2) that is selected from neopentyl glycol, trimethylolethane, trimethylolpropane, trimethylolbutane, pentaerythritol, and dipentaerythritol.

Examples of the fatty acid having a number of carbon atoms of from 3 to 18 include linear and branched fatty acids, such as propionic acid, butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, and oleic acid.

More specifically, examples thereof include linear fatty acids, such as valeric acid (n-pentanoic acid), caproic acid (n-hexanoic acid), enanthic acid (n-heptanoic acid), caprylic acid (n-octanoic acid), pelargonic acid (n-nonanoic acid), capric acid (n-decanoic acid), lauric acid (n-dodecanoic acid), myristic acid (n-tetradecanoic acid), palmitic acid (n-hexadecanoic acid), stearic acid (n-octadecanoic acid), and oleic acid (cis-9-octadecenoic acid); and branched fatty acids, such as isopentanoic acid (3-methylbutanoic acid), 2-methylhexanoic acid, 2-ethylpentanoic acid, 2-ethylhexanoic acid, 3,5,5-trimethylhexanoic acid, neodecanoic acid, and 2-butyloctanoic acid.

The fatty acid (a1) is preferably a fatty acid having a number of carbon atoms of from 5 to 18. Among these, a fatty acid having a number of carbon atoms of from 9 to 12, such as n-nonanoic acid, n-decanoic acid, n-dodecanoic acid, 3,5,5-trimethylhexanoic acid, neodecanoic acid, and 2-butyloctanoic acid, is preferred.

The fatty acid (a1) is preferably a branched fatty acid, and more preferred examples thereof include a branched fatty acid having a number of carbon atoms of from 9 to 12, such as 3,5,5-trimethylhexanoic acid, neodecanoic acid, and 2-butyloctanoic acid. Particularly preferred examples thereof among these include 3,5,5-trimethylhexanoic acid, which is a branched fatty acid having a number of carbon atoms of 9.

As the polyol (a2), a polyol selected from neopentyl glycol, trimethylolethane, trimethylolpropane, trimethylolbutane, pentaerythritol, and dipentaerythritol is used solely or as a combination of two or more kinds thereof. Among these, pentaerythritol and/or dipentaerythritol are preferably used, and pentaerythritol is more preferably used from the standpoint of the compatibility with the refrigerant and the easy enhancement of the oxidation stability.

Examples of the preferred polyol ester (A) include an ester of the fatty acid (a2) containing a fatty acid having a number of carbon atoms of from 5 to 18 and the polyol (a2). In this case, the content of the fatty acid having a number of carbon atoms of from 5 to 18 is preferably 50% by mol or more, and more preferably 70% by mol or more, based on the total amount of the fatty acid (a1), and it is further preferred that the fatty acid (a1) consists of the fatty acid having a number of carbon atoms of from 5 to 18.

Examples of the preferred polyol ester (A) also include an ester of the fatty acid (a1) containing a branched fatty acid and the polyol (a2). In this case, the content of the branched fatty acid is preferably 50% by mol or more, more preferably 70% by mol or more, and further preferably 90% by mol or more, based on the total amount of the fatty acid (a1), and it is particularly preferred that the fatty acid (a1) consists of the branched fatty acid. In this case, the branched fatty acid is preferably a fatty acid having a number of carbon atoms of from 5 to 18 as described above.

Specific examples of the preferred polyol ester (A) include an ester of pentaerythritol and/or dipentaerythritol and a fatty acid containing at least one selected from 3,5,5-trimethylhexanoic acid, neodecanoic acid, and 2-butyloctanoic acid, and an ester of pentaerythritol and/or dipentaerythritol and a fatty acid containing 3,5,5-trimethylhexanoic acid is more preferred.

The polyol ester (A) may be an ester of one kind of the fatty acid, and may be an ester of two or more kinds of the fatty acids. The ester of two or more kinds of the fatty acids may be a mixture of two or more kinds of the esters each of one kind of the fatty acid and the polyol, and is preferably an ester of the mixed fatty acid containing two or more kinds thereof and the polyol since excellent low temperature characteristics and excellent compatibility with a refrigerant may be obtained.

The fatty acid (a1) used is particularly preferably a fatty acid having a number of carbon atoms of 9, and in this case, the fatty acid (a1) may consist only of a fatty acid having a number of carbon atoms of 9, and may contain a fatty acid having a number of carbon atoms of 9 and a fatty acid having a number of carbon atoms other than 9. The fatty acid having a number of carbon atoms other than 9 is preferably a fatty acid having a number of carbon atoms of from 5 to 18, more preferably a fatty acid having a number of carbon atoms of from 8 to 12, and further preferably a fatty acid having a number of carbon atoms of from 10 to 12.

The content of the fatty acid having a number of carbon atoms of 9 is preferably 50% by mol or more, and more preferably 70% by mol or more, based on the total amount of the fatty acid (a1), for enhancing the viscosity characteristics while providing good compatibility.

The polyol ester (A) may be a partial ester with all the hydroxyl groups of the polyol that are not entirely esterified, a full ester with all the hydroxyl groups that are esterified, or a mixture of the partial ester and the full ester, and is preferably the full ester.

The polyol ester (A) preferably has a 40° C. kinetic viscosity of from 30 to 500 mm$^2$/s, and more preferably from 40 to 200 mm$^2$/s. The 100° C. kinetic viscosity thereof is not particularly limited, and is preferably from 5 to 50 mm$^2$/s, and more preferably from 8 to 30 mm$^2$/s.

The viscosity index thereof is not particularly limited, and is preferably 40 or more, more preferably 60 or more, and particularly preferably 80 or more, from the standpoint of providing good viscosity characteristics. The upper limit of the viscosity index is not particularly limited, and is generally approximately 200 or less.

The polyol ester (A) preferably has a hydroxyl value of 5 mgKOH/g or less. When the hydroxyl value is 5 mgKOH/g or less, the decomposition of the polyol ester (A) may be properly suppressed to provide good stability of the refrigerator lubricating oil. In this point of view, the hydroxyl value of the polyol ester (A) is preferably 4 mgKOH/g or less, and more preferably 3.5 mgKOH/g or less.

The polyol ester (A) preferably has an acid value of 0.1 mgKOH/g or less, and more preferably 0.05 mgKOH/g or less, from the standpoint of suppressing the decomposition thereof to enhance the stability of the refrigerator lubricating oil.

The fact that the base oil contains the polyol ester (A) as a major component means that the polyol ester (A) is contained in an amount of 50% by mass or more based on the total amount of the base oil, and the content thereof is preferably 70% by mass or more, more preferably 80% by mass or more, and further preferably 90% by mass or more, based on the total amount of the base oil.

The base oil used in the refrigerator lubricating oil preferably consists of the polyol ester (A). A base oil other than the polyol ester (A) may also be contained in such a range that does not impair the effects of the present invention. Examples of the base oil other than the polyol ester (A) include a polyester compound other than the polyol ester (A), a polyoxyalkylene glycol compound, a polyvinyl ether compound, a copolymer of a poly(oxy)alkylene glycol or a monoether thereof and a polyvinyl ether, a polycarbonate compound, and a hydrogenated product of an α-olefin oligomer, and also include a mineral oil, an alicyclic hydrocarbon compound, and an alkylated aromatic hydrocarbon compound. Examples of the polyester compound other than the polyol ester (A) include a polyol ester of a dihydric to eicosahydric alcohol, preferably a dihydric to decahydric alcohol, and a fatty acid.

The base oil is generally contained in an amount of 70% by mass or more, preferably 80% by mass or more, and more preferably 90% by mass or more, based on the total amount of the refrigerator lubricating oil.

<Disulfide and/or Trisulfide Compound (B)>

The disulfide and/or trisulfide compound (B) used in the present invention is preferably a compound represented by the following general formula (2).

$$R^1 - S_n - R^2 \qquad (2)$$

In the general formula (2), $R^1$ and $R^2$ each independently represent a hydrocarbon having a number of carbon atoms of from 1 to 20, and n represents 2 or 3.

In the formula, $R^1$ and $R^2$ each more specifically represent a linear alkyl group having a number of carbon atoms of from 1 to 20, a branched alkyl group having a number of carbon atoms of from 1 to 20, a cyclic alkyl group having a number of carbon atoms of from 1 to 20, an aryl group having a number of carbon atoms of from 6 to 20, an alkylaryl group having a number of carbon atoms of from 7 to 20, or an arylalkyl group having a number of carbon atoms of from 7 to 20, and may be the same as or different from each other. $R^1$ and $R^2$ each more preferably are a hydrocarbon having a number of carbon atoms of from 3 to 12, and more preferably a hydrocarbon having a number of carbon atoms of from 3 to 8, since the component (B) can easily act on rubber.

In the general formula (I), specific examples of $R^1$ and $R^2$ include a methyl group, an ethyl group, a n-propyl group, a n-butyl group, a n-pentyl group, a n-hexyl group, a n-heptyl group, a n-octyl group, a n-nonyl group, a n-decyl group, a n-dodecyl group, an isopropyl group, an isobutyl group, a sec-butyl group, a tert-butyl group, a branched pentyl group, a branched hexyl group, a branched heptyl group, a branched octyl group, a branched nonyl group, a branched decyl group, a branched dodecyl group, a cyclohexyl group, a cyclooctyl group, a phenyl group, a naphthyl group, a tolyl group, a xylyl group, a benzyl group, and a phenethyl group, and preferred examples thereof include a tert-butyl group and a phenyl group.

Examples of the disulfide and/or trisulfide compound (B) include dibenzyl disulfide, di-tert-nonyl disulfide, didodecyl disulfide, di-tert-butyl disulfide, dioctyl disulfide, diphenyl disulfide, dicyclohexyl disulfide, dibenzyl trisulfide, di-tert-nonyl trisulfide, didodecyl trisulfide, di-tert-butyl trisulfide, dioctyl trisulfide, diphenyl trisulfide, and dicyclohexyl trisulfide. Among these, preferred specific examples thereof include di-tert-butyl disulfide, di-tert-butyl trisulfide, diphenyl disulfide, and diphenyl trisulfide, and among these, di-tert-butyl disulfide, di-tert-butyl trisulfide, and a mixture thereof are more preferred.

In the present invention the disulfide and/or trisulfide compound (B) may be used solely or as a combination of two or more kinds thereof.

In the present invention, the disulfide and/or trisulfide compound (B) is blended in the refrigerator lubricating oil in an amount of from 30 to 10,000 ppm by mass in terms of sulfur equivalent based on the total amount of the refrigerator lubricating oil. In another expression, the sulfur concentration derived from the disulfide and/or trisulfide compound (B) in the refrigerator lubricating oil is from 30 to 10,000 ppm by mass based on the total amount of the refrigerator lubricating oil.

In the present invention, the amount of the component (B) blended may be controlled to make the sulfur equivalent within the aforementioned numerical range, and thereby the swelling of a rubber member can be properly suppressed. While the mechanism thereof is not necessarily clear, it can be expected that when the sulfur equivalent is 30 ppm by mass or more, the component (B) may sufficiently act on the rubber member to prevent the impregnation of the rubber member with the polyol ester (A), whereas when the sulfur equivalent is 10,000 ppm by mass or less, the swelling progressing clue to unnecessary impregnation of the rubber member with the component (B) may be prevented.

In this point of view, the amount of the component (B) blended is preferably from 30 to 5,000 ppm by mass, and more preferably from 50 to 2,000 ppm by mass, in terms of sulfur equivalent.

While not limiting, the disulfide and/or trisulfide compound (B) may be blended in the refrigerator lubricating oil, for example, in an amount of approximately from 0.01 to 3% by mass based on the total amount of the refrigerator lubricating oil, and thereby the sulfur equivalent can be easily within the aforementioned range.

[Other Additives]

The refrigerator lubricating oil of the present invention may contain, in addition to the base oil and the disulfide and/or trisulfide compound (B), at least one additive selected from an extreme pressure agent, an oily agent, an antioxidant, an acid scavenger, a defoaming agent, and the like.

Examples of the extreme pressure agent include a phosphorus extreme pressure agent, such as a phosphate ester, an acidic phosphate ester, a phosphite ester, an acidic phosphite ester, and amine salts thereof.

In the phosphorus extreme pressure agent, tricresyl phosphate, trithiophenyl phosphate, tri(nonylphenyl) phosphite, dioleyl hydrogen phosphite, 2-ethylhexyldiphenyl phosphite, and the like are particularly preferred from the standpoint of the extreme pressure property, the frictional characteristics, and the like.

Examples of the extreme pressure agent also include a metal salt of a carboxylic acid. The metal salt of a carboxylic acid referred herein is preferably a metal salt of a carboxylic acid having a number of carbon atoms of from 3 to 60, and further a fatty acid having a number of carbon atoms of from 3 to 30, and particularly from 12 to 30. Examples thereof also include metal salts of a dimer acid and a trimer acid of the fatty acid, and a dicarboxylic acid having a number of carbon atoms of from 3 to 30. Among these, metal salts of a fatty acid having a number of carbon atoms of from 12 to 30 and a dicarboxylic acid having a number of carbon atoms of from 3 to 30 are particularly preferred.

The metal constituting the metal salt is preferably an alkali metal or an alkaline earth metal, and particularly an alkali metal may be optimum.

Examples of the extreme pressure agent other than those described above include a sulfur extreme pressure agent, such as a sulfurized oil or fat, a sulfurized fatty acid, a sulfurized ester, a thiocarbamate compound, a thioterpene compound, and a dialkyl thiodipropionate compound.

The amount of the extreme pressure agent blended thereto is generally from 0.001 to 5% by mass, and particularly from 0.005 to 3% by mass, based on the total amount of the refrigerator lubricating oil, from the standpoint of the lubricating property and the stability.

The extreme pressure agent may be used solely or as a combination of two or more kinds thereof.

Examples of the oily agent include an aliphatic saturated or unsaturated monocarboxylic acid, such as stearic acid and oleic acid, a polymerized fatty acid, such as a dimer acid and a hydrogenated dimer acid, a hydroxyfatty acid, such as ricinoleic acid and 12-hydroxystearic acid, an aliphatic saturated or unsaturated monohydric alcohol, such as lauryl alcohol and oleyl alcohol, an aliphatic saturated or unsaturated monoamine, such as stearylamine and oleylamine, and an aliphatic saturated or unsaturated monocarboxylic acid amide, such as lauric acid amide and oleic acid amid.

These compounds may be used solely or as a combination of two or more kinds thereof. The amount thereof blended is generally selected from a range of from 0.01 to 10% by mass, and preferably from 0.1 to 5% by mass, based on the total amount of the refrigerator lubricating oil.

As the antioxidant, a phenol antioxidant, such as 2,6-di-tert-butyl-4-methylphenol, 2,6-di-tert-butyl-4-ethylphenol, and 2,2'-methylenebis(4-methyl-6-tert-butylphenol), or an amine antioxidant, such as phenyl-α-naphthylamine and N,N'-diphenyl-p-phenylenediamine is preferably blended. The amount of the antioxidant blended is generally from 0.01 to 5% by mass, and preferably from 0.05 to 3% by mass, based on the total amount of the refrigerator lubricating oil, from the standpoint of the effect and the economic efficiency.

Examples of the acid scavenger include an epoxy compound, such as phenyl glycidyl ether, an alkyl glycidyl ether, an alkylene glycol glycidyl ether, cyclohexene oxide, an α-olefin oxide and an epoxidized soybean oil. Among these, phenyl glycidyl ether, an alkyl glycidyl ether, an alkylene glycol glycidyl ether, cyclohexene oxide, and an α-olefin oxide are preferred from the standpoint of the compatibility.

The alkyl group of the alkyl glycidyl ether and the alkylene group of the alkylene glycol glycidyl ether each may have a branch, and each generally has a number of carbon atoms of from 3 to 30, preferably from 4 to 24, and particularly from 6 to 16. The α-olefin oxide used generally has a total number of carbon atoms of from 4 to 50, preferably from 4 to 24, and particularly from 6 to 16. In the present invention, the acid scavenger may be used solely or as a combination of two or more kinds thereof. The amount thereof blended is generally from 0.005 to 5% by mass, and particularly preferably from 0.05 to 3% by mass, based on the total amount of the refrigerator lubricating oil, from the standpoint of the effect and the prevention of sludge generated.

In the present invention, the use of the acid scavenger blended can enhance the stability of the refrigerator lubricating oil. The combination use thereof with the extreme pressure agent and the antioxidant can exhibit an effect of further enhancing the stability.

Examples of the defoaming agent include a silicone oil and a fluorinated silicone oil.

Other known additives may be blended to the refrigerator lubricating oil of the present invention in such a range that does not impair the objects of the present invention.

The refrigerator lubricating oil may be mixed with a refrigerant to form a mixed composition for a refrigerator, which may be used in a refrigerator. In the mixed composition for a refrigerator, the mass ratio of the refrigerant with respect to the refrigerator lubricating oil (refrigerant/refrigerator lubricating oil) is preferably in a range of from 99/1 to 10/90, more preferably from 95/5 to 30/70, and further preferably from 95/5 to 40/60.

The mass ration within the range can provide a good refrigeration capability and a lubricating performance in a well balanced manner.

[Lubricating Method and Refrigerator]

The lubricating method of the present invention is a lubricating method including using the aforementioned refrigerator lubricating oil in a refrigerator using the aforementioned refrigerant.

The refrigerator contains the refrigerant and the refrigerator lubricating oil mixed with the refrigerant, and any device constituting the refrigerator contains a rubber member that is in contact with the mixed composition for a refrigerator or the refrigerator lubricating oil. While the rubber member is in contact with the mixed composition for a refrigerator or the refrigerator lubricating oil, the refrigerator lubricating oil of the present invention can suppress the swelling of the rubber member. Therefore, the refrigerator of the present invention can suppress leakage of the refrigerator lubricating oil and leakage of the refrigerant caused by the swelling of the rubber member.

The refrigerator of the present invention is preferably a compression refrigerator having at least a compressor, in which the rubber member is preferably a rubber provided in the compressor.

The rubber member is not particularly limited, examples of which include hydrogenated nitrile rubber (H-NBR), nitrile rubber (NBR), chloroprene rubber (CR), an ethylene-propylene-diene terpolymer (EPDM), silicone rubber, butyl rubber (IIR), styrene-butadiene rubber (SBR), urethane rubber (U), chlorosulfonated polyethylene (CSM), and fluorine rubber (FKM), and among these, hydrogenated nitrile rubber, chloroprene rubber, and an ethylene-propylene-diene terpolymer are preferably used.

The refrigerator has, for example, a compressor, a condenser, an expansion mechanism (such as an expansion valve), and an evaporator, or a compressor, a condenser, an expansion mechanism, a dryer, and an evaporator, by which a refrigeration cycle is constituted. The refrigerant used by mixing with the refrigerator lubricating oil is circulated in the refrigeration cycle, and repeatedly absorbs and releases heat. The refrigerator lubricating oil lubricates a sliding portion of the compressor, and the like.

The refrigerator of the present invention can be applied, for example, to a refrigeration system, a hot water supply system, or a heating system, such as a car air-conditioner, a gas heat pump (GHP) system, an air conditioner, a refrigerating chamber, an automatic vending machine, a showcase, a hot water supplier, and a floor heating system, is preferably used in a car air-conditioner, such as an electric car air-conditioner and an open type car air-conditioner, and is particularly suitable for an open type car air-conditioner.

In the system, to which the refrigerator is applied, it is preferred that the water content therein is 300 ppm by mass or less, and the residual air partial pressure therein of 10 kPa or less. The water content is more preferably 200 ppm by mass or less, and the residual air partial pressure is more preferably 5 kPa or less.

[Method for Producing Refrigerator Lubricating Oil]

One embodiment of the method for producing a refrigerator lubricating oil of the present invention is a method including blending: at least a base oil containing, as a major component, a polyol ester (A) of a fatty acid (a1) that is a fatty acid having a number of carbon atoms of from 3 to 18 and a polyol (a2) that is selected from neopentyl glycol, trimethylolethane, trimethylolpropane, trimethylolbutane, pentaerythritol, and dipentaerythritol; and a disulfide and/or trisulfide compound (B) to obtain a refrigerator lubricating oil, and the disulfide and/or trisulfide compound (B) are blended in an amount of from 30 to 10,000 ppm by mass in terms of sulfur equivalent based on the total amount of the refrigerator lubricating oil.

The refrigerator lubricating oil may be blended with other additives depending on necessity. The details of the base oil, the disulfide and/or trisulfide compound (B), the other additives, the resulting refrigerator lubricating oil, the usage thereof, and the like are as described above, and the descriptions thereof are omitted herein.

EXAMPLES

The present invention will be described in more detail with reference to examples below, but the present invention is not limited to the examples.

The properties in the present invention were evaluated in the following manners.

[Evaluation Methods]
(1) 40° C. Kinetic Viscosity and 100° C. Kinetic Viscosity
The kinetic viscosity was measured with a glass capillary viscometer according to JIS K2283.
(2) Viscosity Index
The viscosity index was measured according to JIS K2283.
(3) Acid Value
The acid value was measured by the indicator method according to the "lubricant oil neutralization test method" defined in JIS K2501.
(4) Hydroxyl Value
The hydroxyl value was measured by the neutralization titration method according to JIS K0070.
(5) Rubber Suitability Test
The swelling property of rubber with the mixed composition for a refrigerator was evaluated by immersing a rubber specimen having a dimension of 10 mm×10 mm and a thickness of 2 mm in the mixed composition for a refrigerator and subjecting to an autoclave test. In this test, the mixed composition for refrigerator used had a mass ratio of the refrigerator lubricating oil and the refrigerant of 20/8.5.
Refrigerant: HFO1234yf (2,3,3,3-tetrafluoropropene)
Rubber specimen: HNBR, CR, and EPDM
Test temperature: 175° C.
Test time: 24 hours
Test items: weight change rate (%), volume change rate (%)
In the rubber suitability test in the examples, a specimen where both the weight change rate and the volume change rate of the rubber were 0% or more and less than 7% was considered to be acceptable.

Examples 1 to 10 and Comparative Examples 1 to 3

The refrigerator lubricating oils shown in Table 1 were prepared, and by using R1234yf as a refrigerator, mixed compositions for a refrigerator containing the refrigerator lubricating oil and the refrigerant were produced and subjected to the rubber suitability test. The esters and the sulfur-containing compounds used in Examples and Comparative Examples are as follows. The properties of the following esters 1 to 4 are shown in Table 2.

Ester 1: full ester of pentaerythritol and mixture of 2-ethylhexanoic acid and 3,5,5-trimethylhexanoic acid (molar mixing ratio: 2/8)

Ester 2: full ester of pentaerythritol and 3,5,5-trimethylhexanoic acid

Ester 3: full ester of dipentaerythritol and 3,5,5-trimethylhexanoic acid

Ester 4: full ester of pentaerythritol and mixture of 2-butyloctanoic acid and 3,5,5-trimethylhexanoic acid (molar mixing ratio: 3/7)

Sulfur-containing compound 1: mixture of di-tert-butyl disulfide and di-tert-butyl trisulfide (sulfur content: 38.5% by mass)

Sulfur-containing compound 2: diphenyl disulfide (sulfur content: 29.4% by mass)

Sulfur-containing compound 3: dioctyl sulfide (sulfur content: 12.4% by mass)

TABLE 1

| | | Example 1 | Example 2 | Example 3 | Example 4 | Example 5 | Example 6 | Example 7 | Example 8 | Example 9 | Example 10 | Comparative Example 1 | Comparative Example 2 | Comparative Example 3 |
|---|---|---|---|---|---|---|---|---|---|---|---|---|---|---|
| Refrigerator lubricating oil (% by mass) | Ester 1 | 99.99 | 99.97 | 99.95 | 99.9 | 99.5 | 99 | 99.5 | | | | 100 | 99.5 | 97 |
| | Ester 2 | | | | | | | | 99.99 | | | | | |
| | Ester 3 | | | | | | | | | 99.9 | | | | |
| | Ester 4 | | | | | | | | | | 99.9 | | | |
| | Sulfur-containing compound 1 | 0.01 | 0.03 | 0.05 | 0.1 | 0.5 | 1 | | 0.1 | 0.1 | 0.1 | | | 3 |
| | Sulfur-containing compound 2 | | | | | | | 0.5 | | | | | | |
| | Sulfur-containing compound 3 | | | | | | | | | | | | 0.5 | |
| S content (ppm by mass) | | 38.5 | 115.5 | 192.5 | 385 | 1925 | 3850 | 1470 | 385 | 385 | 385 | 0 | 620 | 11550 |
| H-NBR | Weight change rate (%) | 5.5% | 5.2% | 5.2% | 5.4% | 5.6% | 6.2% | 5.8% | 3.8% | 2.1% | 2.7% | 7.2% | 9.6% | 7.2% |
| | Volume change rate (%) | 6.8% | 6.7% | 6.6% | 5.8% | 5.2% | 6.0% | 6.9% | 4.0% | 2.3% | 3.2% | 7.7% | 10.3% | 7.9% |
| EPDM | Weight change rate (%) | — | — | — | 5.9% | — | — | — | 4.0% | 2.5% | 3.0% | 8.8% | — | 8.9% |
| | Volume change rate (%) | — | — | — | 6.1% | — | — | — | 4.2% | 2.7% | 3.3% | 9.3% | — | 9.5% |
| CR | Weight change rate (%) | — | — | — | 6.2% | — | — | — | 4.8% | 3.0% | 3.5% | 11.2% | — | 12.3% |
| | Volume change rate (%) | — | — | — | 6.5% | — | — | — | 5.0% | 3.2% | 2.8% | 12.3% | — | 12.8% |

* In Table 1, "S content" means the amount of the sulfur-containing compound in terms of sulfur equivalent (ppm by mass) blended in the refrigerator lubricating oil.

TABLE 2

| | Viscosity (mm²/s) 40° C. | Viscosity 100° C. | Viscosity index | Acid value (mgKOH/g) | Hydroxyl value (mgKOH/g) |
|---|---|---|---|---|---|
| Ester 1 | 92 | 10.2 | 90 | 0.01 | 1> |
| Ester 2 | 113 | 11.5 | 87 | 0.01 | 1> |
| Ester 3 | 462 | 27.92 | 84 | 0.01 | 1> |
| Ester 4 | 87.65 | 10.20 | 97 | 0.01 | 1> |

As described above, the swelling of rubber members was suppressed in Examples 1 to 10, in which the disulfide and/or trisulfide compound as a sulfur-containing compound was blended, and the particular polyol ester was used as the base oil. On the other hand, in Comparative Examples 1 and 2, no sulfur-containing compound was blended, or the sulfur-containing compound used was a monosulfide compound, and thus the swelling of rubber members was not sufficiently suppressed. In Comparative Example 3, the amount of the sulfur-containing compound blended was too large, and thus the swelling of rubber members was not sufficiently suppressed.

INDUSTRIAL APPLICABILITY

The mixed composition for a refrigerator of the present invention can be applied to a car air-conditioner, a gas heat pump (GHP) system, an air conditioner, a refrigerating chamber, an automatic vending machine, a showcase, a hot water supplier, a floor heating system, and the like, and may be particularly preferably applied to a car air-conditioner, such as an electric car air-conditioner and an open type car air-conditioner.

The invention claimed is:

1. A refrigerator lubricating oil, comprising:
a base oil comprising, as a major component, a polyol ester (A) of a fatty acid (art) having a number of carbon atoms of from 3 to 18 and a polyol (a2) that is at least one selected from the group consisting of neopentyl glycol, trimethylolethane, trimethylolpropane, trimethylolbutane, pentaerythritol, and dipentaerythritol; and
a disulfide compound (B) and a trisulfide compound (B), blended in an amount of from 30 to 10,000 ppm by mass in terms of sulfur equivalent based on a total amount of the refrigerator lubricating oil,
wherein the disulfide compound (B) and the trisulfide compound (B) are represented by formula (2):

$$R^1-S_n-R^2 \qquad (2),$$

wherein:
R¹ and R² are each independently a hydrocarbon having a number of carbon atoms of from 1 to 4; and
n is 2 in the disulfide compound (B) and n is 3 in the trisulfide compound (B).

2. The refrigerator lubricating oil according to claim 1, wherein the fatty acid (a1) is a fatty acid having a number of carbon atoms of from 5 to 18.

3. The refrigerator lubricating oil according to claim 1, wherein the polyol (a2) is pentaerythritol, dipentaerythritol, or both.

4. The refrigerator lubricating oil according to claim 1, wherein the polyol ester (A) is an ester of a mixed fatty acid of two or more kinds thereof and the polyol (a2).

5. The refrigerator lubricating oil according to claim 1, wherein the refrigerator lubricating oil further comprises: at least one additive selected from the group consisting of an extreme pressure agent, an oily agent, an antioxidant, an acid scavenger, and a defoaming agent.

6. A mixed composition for a refrigerator, the mixed composition comprising:
a refrigerant comprising at east one unsaturated fluorinated hydrocarbon compound represented by formula (1):

$$C_pF_rH_s \qquad (1).$$

wherein:
p represents an integer of from 2 to 6;
r represents an integer of from 1 to 11; and
s represents an integer of from 1 to 11,
provided that the compound has one or more carbon-carbon unsaturated bond in a molecule; and
a refrigerator lubricating oil comprising:
a base oil comprising, as a major component, a polyol ester (A) of a fatty acid (a1) having a number of carbon atoms of from 3 to 18 and a polyol (a2) that is at least one selected from the group consisting of neopentyl glycol, trimethylolethane, trimethylolpropane, trimethylolbutane, pentaerythritol, and dipentaerythritol; and
a disulfide compound (B) and a trisulfide compound (B), blended in an amount of from 30 to 10,000 ppm by mass in terms of sulfur equivalent based on a total amount of the refrigerator lubricating oil,
wherein the disulfide compound (B) and the trisulfide compound (B) are represented by formula (2):

$$R^1-S_n-R^2 \qquad (2)$$

wherein:
R¹ and R² are each independently a hydrocarbon having a number of carbon atoms of from 1 to 4; and
n is 2 in the disulfide compound (B) and n is 3 in the trisulfide compound (B).

7. The mixed composition for a refrigerator according to claim 6, wherein the refrigerant consists of the unsaturated fluorinated hydrocarbon compound.

8. The mixed composition for a refrigerator according to claim 6, wherein the refrigerant further comprises at least one saturated fluorinated hydrocarbon compound selected from the group consisting of 1,1-difluoroethane, trifluoroethane, tetrafluoroethane, and pentafluoroethane.

9. The mixed composition for a refrigerator according to claim 6, wherein the unsaturated fluorinated hydrocarbon compound is a fluoride of propene.

10. The mixed composition for a refrigerator according to claim 9, wherein the fluoride of propene is at least one selected from the group consisting of isomers of pentafluoropropene, 3,3,3-trifluoropropene, 1,3,3,3-tetrafluoropropene, and 2,3,3,3-tetrafluoropropene.

11. A refrigerator, comprising:
a refrigerant comprising at least one unsaturated fluorinated hydrocarbon compound represented by formula (1):

$$C_pF_rH_s \qquad (1),$$

wherein:
p represents an integer of from 2 to 6;
r represents an integer of from 1 to 11; and
s represents an integer of from 1 to 11,
provided that the compound has one or more carbon-carbon unsaturated bond in a molecule; and a refrigerator lubricating oil comprising:
- a base oil containing, as a major component, a polyol ester (A) of a fatty acid (a1) that is a fatty acid having a number of carbon atoms of from 3 to 18 and a polyol (a2) that is at least one selected from the group consisting of neopentyl glycol, trimethylolethane, trimethylolpropane, trimethylolbutane, pentaerythritol, and dipentaerythritol; and
- a disulfide compound (B) and a trisulfide compound (B), blended in an amount of from 30 to 10,000 ppm by mass in terms of sulfur equivalent based on a total amount of the refrigerator lubricating oil, wherein the disulfide compound (B) and the trisulfide compound (B) are represented by formula (2):

$$R^1-S_n-R^2 \qquad (2),$$

wherein:
$R^1$ and $R^2$ are each independently a hydrocarbon having a number of carbon atoms of from 1 to 4; and
n is 2 in the disulfide compound (B) and n is 3 in the trisulfide compound (B).

12. The refrigerator according to claim 11, further comprising at least one rubber member selected from the group consisting of a hydrogenated nitrile rubber, a nitrile rubber, a chloroprene rubber, an ethylene-propylene-diene terpolymer, a silicone rubber, a butyl rubber, a styrene-butadiene rubber, a urethane rubber, a chlorosulfonated polyethylene, and a fluorine rubber.

13. The refrigerator according to claim 12, wherein the rubber member is at least one selected from the group consisting of a hydrogenated nitrile rubber, a chloroprene rubber, and an ethylene-propylene-diene terpolymer.

14. A refrigerator system, comprising the refrigerator lubricating oil according to claim 1,
wherein the refrigerator system is a hot water supply system, or a heating system selected from the group consisting of a car air-conditioner, a gas heat pump system, an air conditioner, a refrigerating chamber, an automatic vending machine, a showcase, a hot water supplier, and a floor heating system.

15. The refrigerator system according to claim 14, wherein the system has a water content therein of 300 ppm by mass or less and a residual air partial pressure therein of 10 kPa or less.

* * * * *